United States Patent
Erickson (12)

(10) Patent No.: US 6,237,284 B1
(45) Date of Patent: *May 29, 2001

(54) METHOD FOR RECYCLING CARBON DIOXIDE FOR ENHANCING PLANT GROWTH

(75) Inventor: Stewart E. Erickson, Marietta, PA (US)

(73) Assignee: The Agricultural Gas Company, Hudson, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 08/882,865

(22) Filed: Jun. 26, 1997

Related U.S. Application Data (62) Division of application No. 08/515,106, filed on Aug. 14, 1995, now Pat. No. 5,682,709, which is a continuation of application No. 08/250,415, filed on May 27, 1994, now abandoned.

(51) Int. Cl.⁷ .................. A01G 7/02; A01G 1/00
(52) U.S. Cl. ............. 47/58.1; 47/1.5; 47/DIG. 10
(58) Field of Search .......... 47/58, 1.4, DIG. 10, 47/58.1, 1.5, 48.5

(56) References Cited

U.S. PATENT DOCUMENTS

| | | | | |
|---|---|---|---|---|
| 1,908,164 | * | 5/1933 | Minor | 47/58 |
| 1,991,851 | * | 2/1935 | Hammell | 47/58 |
| 3,385,786 | * | 5/1968 | Klock | 47/1.4 |
| 3,577,678 | | 5/1971 | Burton | 47/58 |
| 3,936,117 | * | 2/1976 | Reinke | 339/8 R |
| 4,073,089 | | 2/1978 | Maginnes et al. | 47/17 |
| 5,300,226 | | 4/1994 | Erickson | 210/603 |

FOREIGN PATENT DOCUMENTS

| | | | |
|---|---|---|---|
| 120071 | 5/1976 | (DE) . | |
| 2264087 | 10/1975 | (FR) . | |
| 2205723 | * 12/1981 | (GB) | 47/58 |
| 2205723 | * 12/1988 | (GB) | 47/58 |
| 4190829 | 7/1992 | (JP) . | |

OTHER PUBLICATIONS

Pearce, "The High Cost of Carbon Dioxide", New Scientist, vol. 130, No. 1882, Jul. 17, 1993, pp. 26–29.

Pruschek, "Retention and Disposing of CO2", Proceedings of the VDI–GET Conference: Influence of Man on Climate III, Nov. 25, 1992, Dusseldort (DE, pp. 71–88).

Fulkerson et al., "Stabilizing Atmospheric CO2 Concentrations by Reducing Emissions from Fossil Fuel Consumption . . . ", Technologies for a Greenhouse–Constrained Society, Jun. 13, 1995, Oak Ridge, TN, pp. 307–323.

Greenhouse Tomatoes, Lettuce and Cucumbers, "Cultural Requirements", pp. 190–203, S. Honma and S.H. Wittwer (1979).

Energy Sence (Spring 1985), "Biomass—Energy in the Future", pp. 20–22.

* cited by examiner

*Primary Examiner*—David T. Fox
*Assistant Examiner*—Ashwin Mehta
(74) *Attorney, Agent, or Firm*—Fredrikson & Byron (57) ABSTRACT

The invention provides a method of recycling carbon dioxide for enhancing plant growth. The method advantageously uses a dual use irrigation system which is capable of separately distributing water and carbon dioxide gas to a tract of plants.

14 Claims, 11 Drawing Sheets

METHOD FOR RECYCLING CARBON DIOXIDE FOR ENHANCING PLANT GROWTH

This application is a division of application Ser. No. 08/515,106 filed Aug. 14, 1995 which application is now: (U.S. Pat. No. 5,682,709), which is a continuation of application Ser. No. 08/250,415 filed May 27, 1994 (abandoned).

FIELD OF THE INVENTION

The present invention relates to a method for recycling carbon dioxide for enhancing plant growth.

BACKGROUND OF THE INVENTION

Carbon dioxide presents several environmental problems in modern society. Carbon dioxide is a colorless, odorless component of the earth's atmosphere that is transparent to visible light, but opaque to long wave infrared radiation. Carbon dioxide is an important component of the earth's atmosphere because it allows visible light to pass through the atmosphere while trapping part of the long wave infrared radiation as it reflects and radiates from the surface of the earth in the form of heat. This heat capturing quality of the earth's atmosphere maintains the delicate balance that safely sustains life on earth within the frigid voids of space. Unfortunately, modern processes emit tremendous quantities of carbon dioxide into the atmosphere, which will likely lead to a continuous terrestrial warming. It is feared that such warming will cause a heat and radiation imbalance similar to the principal employed to heat greenhouses, thereby altering the ecosystem. Therefore, the need exists to reduce the amount of carbon dioxide that enters the atmosphere.

Two basic alternatives exist to reduce the amount of carbon dioxide entering the atmosphere. The first alternative involves reducing the amount of carbon dioxide that is emitted from industrial processes. The second alternative involves recycling the carbon dioxide within the earth's atmosphere.

Recycling carbon dioxide will greatly reduce the potential for terrestrial warming, and if recycled properly, additional environmental problems may be substantially reduced. One such problem is the amount of water used to irrigate crops in the areas where water is in short supply, such as in the western United States. A significant amount of money has been spent building an infrastructure to store water in dams, retrieve water from underground aquifers and deliver water from where it is stored to the crops via aqueducts. The current water management system in the United States has caused significant environmental damage. Many major rivers, such as the Colorado River, have significantly reduced stream flows because of the amount of water that is used from these rivers to irrigate crops. Reduced stream flows significantly damage fish runs and drain valuable wet lands, destroying valuable and irreplaceable ecosystems. Also, water from underground aquifers is being drained faster than it can be replenished, causing the water level in some aquifers to drop as much as thirty feet in one year. As these underground aquifers continue to be drained, the pumping height increases, causing a greater expenditure of energy to pump the same volume of water. Additionally, soil salinization occurs after extensive irrigation because salts build up in the ground water and at the surface. Certain parts of the San Joaquin Valley in California have salt levels that are toxic to plants because of over irrigation.

Another significant problem that may be substantially reduced by recycling carbon dioxide is the use of fertilizers and pesticides to enhance agricultural yields. Although fertilizers enhance the growth of many crops, they also damage the soil and leach into the ground water, contaminating the surrounding environment. Similarly, pesticides damage the soil and are a health hazard to small children who eat foods which have been treated with pesticides. Pesticides and fertilizers also are costly to buy and distribute onto the crops. Therefore, the need exists to reduce carbon dioxide pollution to prevent global warming, while also reducing the amount of water irrigation and chemical treatment of agricultural crops.

The environmental problems of carbon dioxide pollution, irrigation of crops and chemical treatment of crops can be addressed by recycling carbon dioxide for absorption into plants. It is well known that plants require carbon dioxide gas to "breathe." During the process of photosynthesis, plants exchange carbon dioxide gas, oxygen and water through their stomatal openings when they are exposed to sunlight. This process is known as transpiration. As plants transpire, carbon dioxide gas enters the plant and water evaporates through the stomatal openings. It is well known that carbon dioxide gas is a limiting factor in plant growth, and that exposing plants to greater ambient carbon dioxide gas concentrations will produce greater plant growth. Such exposure to above normal ambient carbon dioxide concentrations will also cause the stomata to restrict, thereby significantly reducing the amount of water lost during transpiration.

One advantage of exposing crops to carbon dioxide is that a significant amount of carbon dioxide will be absorbed by the crops instead of entering the atmosphere. Another advantage of exposing crops to carbon dioxide is a significant reduction in the amount of water required to grow crops. As discussed above, the introduction of carbon dioxide enhances the efficiency of the transpiration process which reduces the amount of water the plants lose through their stomata. In addition, the total number of plants can be reduced because each individual plant will produce a higher yield, thereby reducing the number of plants required to grow the same volume. This will not only reduce the burden that irrigating crops places on rivers, lakes and underground aquifers, but it will also reduce the increasing cost of storing and delivering the water.

Another advantage of exposing crops to carbon dioxide is a significant reduction in the amount of fertilizer required to grow high yield crops. Instead of using chemical fertilizers to enhance growth, carbon dioxide will provide sufficient growth rates to produce the required yield. This will reduce the contamination caused by fertilizers and the associated health hazards that fertilizers have on small children. Therefore, a tremendous need exists to recycle carbon dioxide gas by large-scale exposure for absorption into plants in order to simultaneously reduce carbon dioxide pollution, irrigation requirements and the use of fertilizers.

Yet another advantage of exposing crops to carbon dioxide is the use of carbon dioxide as a substitute for environmentally damaging pesticides. Pulses of carbon dioxide concentrations can be used to flood the crops with carbon dioxide, thereby displacing the oxygen next to the plants and suffocating unwanted insects. Alternatively, low concentrations of safe pesticides may be added to a carbon dioxide stream being delivered to the crops.

Current methods and apparatuses, however, are not effective or economically viable. Enhancing plant growth using carbon dioxide is presently being employed in greenhouses. Although greenhouses are advantageous in that they may use natural sunlight and the delivery of the carbon dioxide is easily controlled, it is impractical to encapsulate entire crops with a greenhouse in order to deliver and keep the carbon dioxide in close association with the biomass. In other cases, carbon dioxide has been drawn from the depths of coal mines, and pumped into greenhouses. In addition to the problems associated with greenhouses, oxygen-rich ambient air enters the coal mines as the carbon dioxide is withdrawn, causing oxidation of pyrites in the mines, which leads to acid mine drainage.

Another current solution of distributing carbon dioxide to plants uses a fixed overhead gas irrigation system suspended from the roof of a greenhouse. Such fixed systems are not practically applied to outdoor application in large fields because they would obstruct tractors, harvesters or other farm equipment necessary to grow and harvest crops and carbon dioxide delivery to the plants would be disrupted by wind currents.

Free-air $CO_2$ enrichment systems have been developed in which carbon dioxide is distributed to plants using a system of horizontal and vertical pipes with discharge jets through which carbon dioxide may pass. The free-air $CO_2$ enrichment systems, however, do not address the problem of deploying tractors and other farm equipment in fields having such piping. Additionally, such systems are generally inefficient because a great deal of carbon dioxide is lost to the atmosphere.

Attempts have also been made to irrigate plants with carbonated water. The concept is that the carbonated water would release carbon dioxide into the plants as the carbon dioxide escapes from the water. These attempts, however, have proven deficient because such carbon dioxide has a low density and merely rises in the surrounding ambient air.

Experiments have been employed utilizing carbon dioxide by bubbling the carbon dioxide through algae ponds to allow aquatic vegetation to consume the carbon dioxide. Although certain algae consume large amounts of carbon dioxide, this method may be impractical because thousands of square miles of water is required to absorb even a small fraction of the carbon dioxide that is produced and delivery of the carbon dioxide to remote locations such as in the ocean may be very costly. Additionally, the effects of growing such large quantities of algae on the environment have not yet been ascertained, and it is possible that such large quantities of algae may have negative environmental ramifications.

A method and means for enhancing plant growth under field conditions is disclosed in the present inventor's U.S. Pat. No. 5,300,226 for a WASTE HANDLING METHOD, the disclosure of which is herein incorporated by reference. This patent discloses a plurality of trenches which may be located above a strip mine for growing plants, but it does not provide a particularly effective method for economically increasing the density of the carbon dioxide to limit loss of carbon dioxide to the atmosphere before it can be absorbed by the plants.

The current methods and apparatuses for delivering carbon dioxide to plants fail to provide an effective system for enhancing plant growth. One problem common to such systems is that they do not provide a method or system that addresses the transmission, storage, and distribution problems associated with delivering large volumes of carbon dioxide to large agricultural and silvicultural uses in a manner that will prevent the carbon dioxide from entering the atmosphere before it is absorbed. Therefore, there is presently a significant need to provide a method that economically and effectively distributes large quantities of carbon dioxide to plants in order to reduce the amount of carbon dioxide in the atmosphere and to use waste carbon dioxide for beneficial purposes, such as to reduce the amount of water and fertilizer used to grow crops.

In addition to recycling carbon dioxide for absorption in plants, carbon dioxide may be used to reduce the potential for fires in abandoned mines. In order to avoid such fires, mine operators currently install elaborate and expensive fire prevention systems when a mine is shut down. Recycling carbon dioxide into mines, however, will displace the oxygen necessary for combustion. Thus, recycling carbon dioxide into a mine after it is shut down will significantly reduce mine fires at a fraction of the cost of current systems.

SUMMARY OF THE INVENTION

The method of the current invention provides a unique system for recycling carbon dioxide for absorption in plants. The method includes capturing carbon dioxide from a carbon dioxide producing source. The most prominent sources of carbon dioxide are centralized industrial complexes where fossil fuels are combusted, such as power producing facilities and large industrial manufacturing facilities. Other significant sources of carbon dioxide include composting and anaerobic digestion sites.

The method continues by depositing the captured carbon dioxide in an underground void that is substantially free of methane and other gases toxic to plants, and has a temperature that is less than the ambient daytime temperature during the growing season. One type of underground void contemplated in the present invention is an abandoned mine, in which the captured carbon dioxide may be pumped down through the existing ventilation system into the cooler recesses of the mine. Once deposited, the method includes storing the carbon dioxide in the underground void at least until the carbon dioxide obtains a temperature that is less than ambient temperature, and then transporting the cooled carbon dioxide from the underground void to a tract of plants. The transportation step of the present invention may be accomplished by siphoning or pumping the carbon dioxide from the underground void into a system for carrying the cooled carbon dioxide to the tract of plants. Once the cooled carbon dioxide is transferred to the tract of plants, the method concludes by distributing the cooled carbon dioxide to the plants in the tract.

The method of the present invention provides a cost efficient and effective means of recycling carbon dioxide for enhancing plant growth. One advantage of the invention is that it reduces the amount of carbon dioxide entering the atmosphere by beneficially recycling the gas to enhance plant growth. Another advantage of the invention is that by enhancing plant growth, it reduces the amount of fertilizer required to grow agricultural plants, thereby reducing the amount of fertilizer pollution. Yet another advantage of the invention is that it reduces the current strain on our water distribution system by significantly reducing the amount of water used by each plant.

DETAILED DESCRIPTION OF THE PREFERRED EMBODIMENT

The method of the invention may involve the steps of capturing carbon dioxide, depositing the captured carbon dioxide into underground voids, storing the carbon dioxide, transporting the stored carbon dioxide to a tract of plants, and distributing the carbon dioxide to the plants in the tract. The method may also include the further steps of encapsulating the carbon dioxide after it has been captured, and hauling the encapsulated carbon dioxide to an underground void. An embodiment of the invention providing the necessary structure, implementation and use of the method of the invention will be clearly understood by referring to FIGS. 1–12 and the following description.

Carbon dioxide is produced by a host of natural and industrial processes. The most prominent source of carbon dioxide is the combustion of fossil fuels; other sources include biological decomposition processes, including composting, anaerobic digestion and fermentation. In order to prevent carbon dioxide from entering the atmosphere, the method of the invention involves capturing the carbon dioxide after it has been produced.

The most readily captured carbon dioxide comes from fixed point sources (62 in FIGS. 2a and 2b) where fossil fuels are burned. In a preferred embodiment, carbon dioxide is captured from facilities that produce heat or electricity by burning carbon fuels. Other prominent sources include steel manufacturing facilities, other types of power-producing facilities and other sites that burn fossil fuels. It will be appreciated that the capturing step of the present invention is not limited to such sources, but may include any source where carbon dioxide is produced. Generally, the preferred embodiment of the invention involves capturing carbon dioxide from a fixed point source where the carbon dioxide would otherwise be released into the atmosphere through an exhaust stack or the like.

Carbon dioxide may be captured from fixed point sources using a number of available devices and methods. One such device is described in U.S. Pat. No. 4,073,099 for a SYSTEM OF UTILIZATION OF EXHAUST GASES FOR PLANT GROWTH, herein incorporated by reference, which discloses a membrane that is used in exhaust flues to isolate carbon dioxide from other materials. Another known method, called adsorption, captures carbon dioxide from dehumidified flue gas. By feeding the flue gas into a series of large tanks, each tank may hold approximately 4,500 lbs. of zeolite pellets or an equivalent. The carbon dioxide adsorbs onto the zeolite as it filters through the pellets, and the gas flow is diverted to a subsequent tank after the zeolite is saturated. The carbon dioxide is separated from the zeolite in the initial tank by depressurizing and heating the zeolite. The carbon dioxide may then be collected and compressed in separate tanks.

Another known process, called absorption, relies on a chemical reaction using monoethanolamine and similar chemicals. In the absorption method, the monoethanolamine drips through a succession of chambers as the flue gas travels up the exhaust flue. The carbon dioxide reacts with the monoethanolamine, and the carbon dioxide-laden monoethanolamine is collected at the bottom. The carbon dioxide-laden monoethanolamine is then removed from the flue, reheated to release the carbon dioxide, and then the monoethanolamine is recycled. The carbon dioxide that is released from the monoethanolamine is collected and compressed in tanks.

In addition to capturing carbon dioxide from point sources, carbon dioxide may also be captured over relatively large areas where carbon dioxide is produced by biological decomposition. In order to capture carbon dioxide over such large areas, air can be drawn inwardly through the composting area so that the carbon dioxide is mechanically inhaled at the center of such areas. The air and carbon dioxide may then be diverted to a nearby facility that separates the carbon dioxide and stores it in a container. Carbon dioxide may also be collected from composting areas by covering the composting areas and pumping oxygen into the enclosure, thereby expelling the carbon dioxide. In a preferred embodiment, the composting facility or anaerobic digester is located underground in an abandoned mine or the like, in which the carbon dioxide may simply be captured in the underground cavity as it is naturally released. By locating the source of carbon dioxide underground, the extent of specialized equipment necessary to capture the carbon dioxide is significantly reduced.

After the carbon dioxide is captured, the next step involves depositing the captured carbon dioxide in an underground void. This step may involve providing a specific type of underground void 5, transferring the carbon dioxide from the source where it is captured to such an underground void, and depositing the carbon dioxide in the underground void. This aspect of the invention requires underground voids 5 that are essentially free of methane and other gases that are toxic to plants, and have temperatures that are less than the ambient daytime temperature during the growing season. By being substantially free of such gases, the voids 5 will not contaminate the carbon dioxide and render it toxic to plants. The underground void may be an abandoned mine 5 or natural geologic formation 5', such as underground aquifer, but any natural or man-made underground void meeting the above requirements may be used. Ideally, such an abandoned mine is located near a source of carbon dioxide and a tract of plants, although such a location is not necessary.

Figure 1:
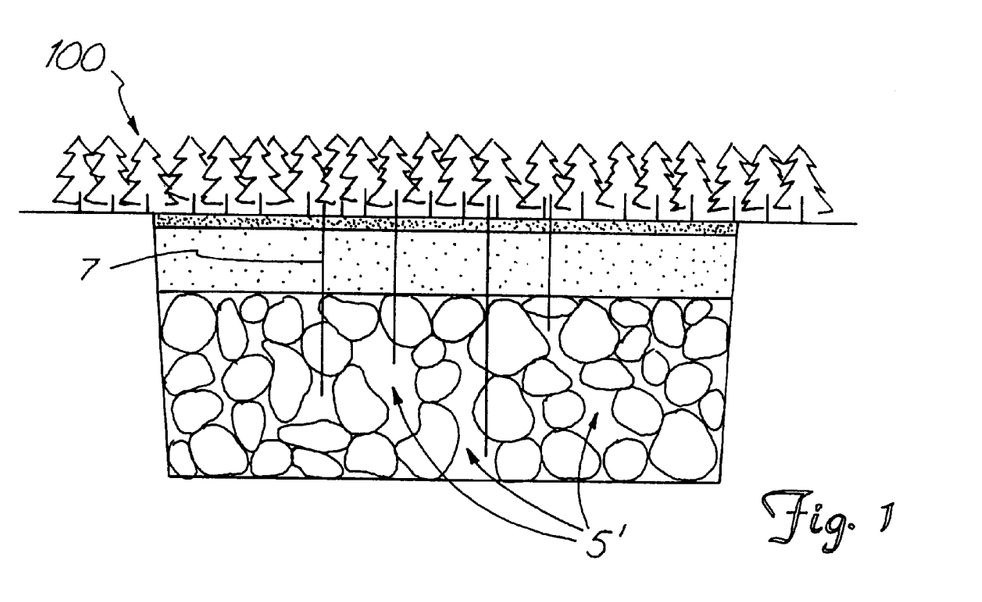
FIG. 1 is a schematic illustration of an embodiment of the method of the invention.
Figure 2A:
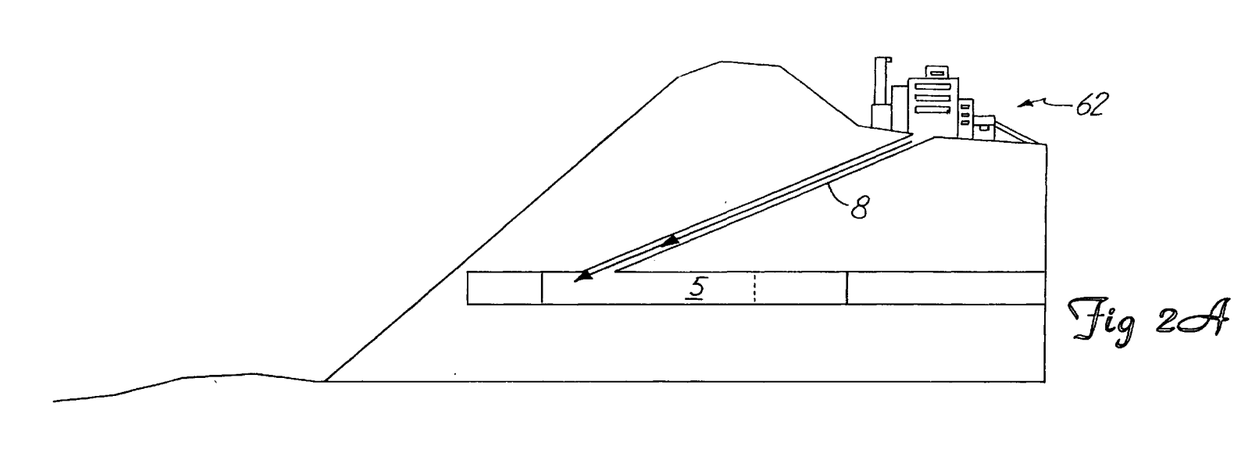
FIG. 2a is a schematic illustration of another embodiment of the method of the present invention.
Figure 2B:
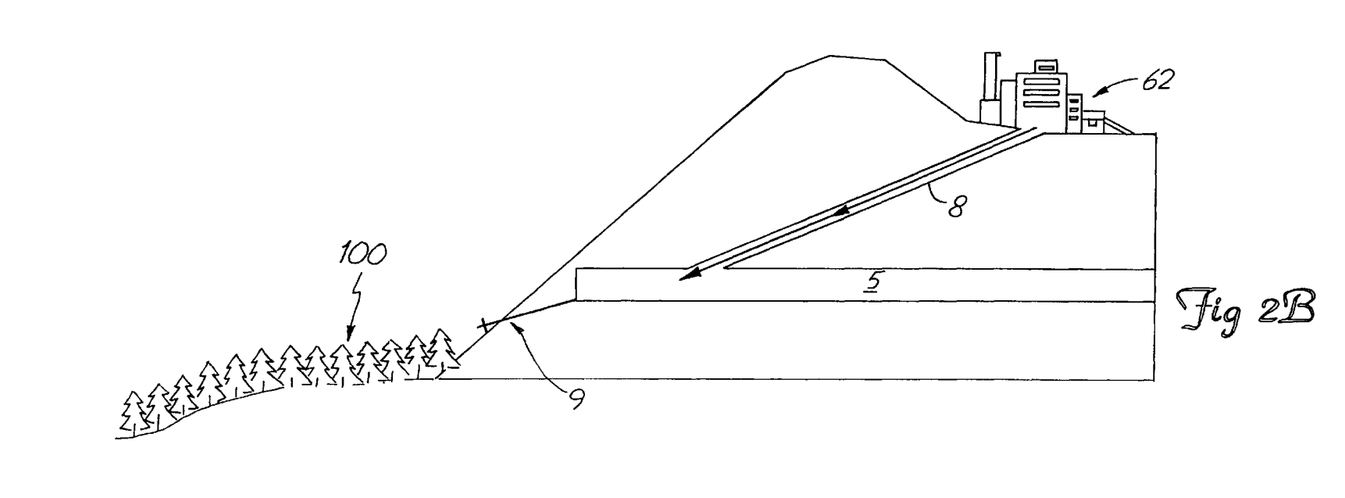
FIG. 2b is a schematic illustration of another embodiment of the method of the present invention.

If the carbon dioxide is collected above ground, e.g., as shown in FIGS. 2a and 2b, the depositing step of the invention will also include transferring the captured carbon dioxide to the underground void. In a preferred embodiment, the underground void 5 is located proximally to a source of carbon dioxide 62 so that the captured carbon dioxide may be directly deposited 8 into the underground void using a pipe, or some other suitable conduit for gases. In cases where the underground voids are not located proximally to the sources of carbon dioxide, the depositing step may further include encapsulating the captured carbon dioxide (such as in a pressurized tank, not shown), and hauling it from the sources to the underground voids. In a preferred embodiment, the captured carbon dioxide is hauled from a point source to an underground void that is an abandoned mine using the backhaul leg of a dedicated coal railcar line. In such an embodiment, the carbon dioxide may be hauled in its gas, liquid or solid states.

In the event that the carbon dioxide is hauled in its liquid state, the liquified carbon dioxide may be encapsulated in a conventional tanker car. Preferably, the carbon dioxide is encapsulated and hauled in its gaseous or solid state. In such a preferred embodiment, the carbon dioxide is encapsulated in collapsible intermodal containers. One embodiment of such collapsible intermodal containers are described in the present inventor's U.S. Pat. application Ser. Nos. 08/233,111 (abandoned), for a COLLAPSIBLE CONTAINER FOR HAULING BULK MATERIALS, and 08/190,989 (U.S. Pat. No. 5,554,639, for a CONTAINER AND METHOD FOR TRANSPORTING FINELY DIVIDED AND DRIED COAL, both of which are herein incorporated by reference.

When the carbon dioxide is hauled in its solid state, it may be crushed and placed into the collapsible intermodal containers. In order to remove the solid carbon dioxide from the collapsible intermodal containers after they have been transferred to an underground void, the collapsible intermodal containers may simply be opened and the solid carbon dioxide allowed to sublimate out of the container. In another embodiment, a hood or suction means may be placed over the open collapsible intermodal containers to increase the rate of sublimation. When the carbon dioxide is to be encapsulated in its gaseous state, it may be placed directly into the collapsible intermodal containers.

After the captured carbon dioxide is transferred to a location adjacent an underground void, it may be deposited in the voids by pumping it down to an appropriate depth. In one preferred embodiment, the underground void is a mine 5 provided with an existing ventilation system 8 for delivering fresh air from the surface to the far reaches of the mine. Generally, all modern underground mining operations utilize such delivery systems. In this embodiment, the carbon dioxide may be deposited in the underground mines by simply feeding it into the existing ventilation system for delivering fresh air into the mines. Large volumes of carbon dioxide may be deposited into an underground void in this manner.

After the carbon dioxide is deposited into an underground void, the present invention involves storing the carbon dioxide in the voids. The purpose of storing the carbon dioxide in the cool underground voids is to increase the density of the carbon dioxide. Although carbon dioxide is naturally more dense than ambient air at the same temperatures, captured carbon dioxide is generally heated to a point where its density is less than that of ambient air. As such, if captured carbon dioxide is distributed to a tract of plants, it will rise and diffuse into the atmosphere before the plants are able to absorb the carbon dioxide for photosynthesis. Therefore, by increasing the density of the carbon dioxide before it is delivered to the plant, the carbon dioxide stays in close proximity to the plants during the photosynthesis process.

The storing step of the present invention includes keeping the deposited carbon dioxide in a cool underground void having a temperature that is less than the ambient daytime temperature during the growing season until the carbon dioxide cools to a temperature that is at least equal to, and preferably less than, the ambient daytime temperature. In a preferred embodiment, the carbon dioxide is stored in an underground void having a temperature that is less than 65° F. until the carbon dioxide reaches a temperature that is less than 68° F. By reducing the temperature of the carbon dioxide, the density of the carbon dioxide will be increased sufficiently to permit the carbon dioxide to stay in close proximity to the plants until it can be absorbed by the plants.

After the storing step of the present invention, the method includes transporting the densified carbon dioxide to a tract of plants. In a preferred embodiment, the transportation step of the present invention includes an infrastructure extending between the underground void and a large agricultural producing region. The infrastructure is preferably a system of pipes that will be provided from the underground storage void to the regions where crops are growing. In the case where mining lands are being reclaimed, the distances using the infrastructure may be fairly short because such lands are located proximately to abandoned mines. Referring to FIGS.

1, 2A and 2B, it will be appreciated that a tract of plants located in close proximity to the underground voids will require a minimal amount of infrastructure to transport the carbon dioxide from the underground void to the plants. In a preferred embodiment, an underground pipe (7 in FIG. 1 or 9 in FIG. 2B) may be used that directly connects the underground void to the plants.

In other cases, the underground voids may be located some distance from the agricultural regions. One such case is the San Joaquin Valley in central and southern California. The infrastructure required to perform the transportation step in such a region may include a system of pipes extending from the underground void directly to the growing region. Another embodiment, shown in FIG. 4, may include a system of underground pipes from the underground void extending to the existing aqueducts 26 that run through many of the growing regions in the western United States. For example, once the pipes reach the aqueduct, another pipe or hose 22 may be positioned on the floor of the aqueduct underneath the water 29 throughout the length of the growing region. Since the water in such aqueducts is usually relatively cool compared to the ambient air, it is possible to maintain the relatively cool temperature and high density of the carbon dioxide. It will also be appreciated that using such aqueducts will reduce the need for obtaining new right-of-ways.

Figure 5:
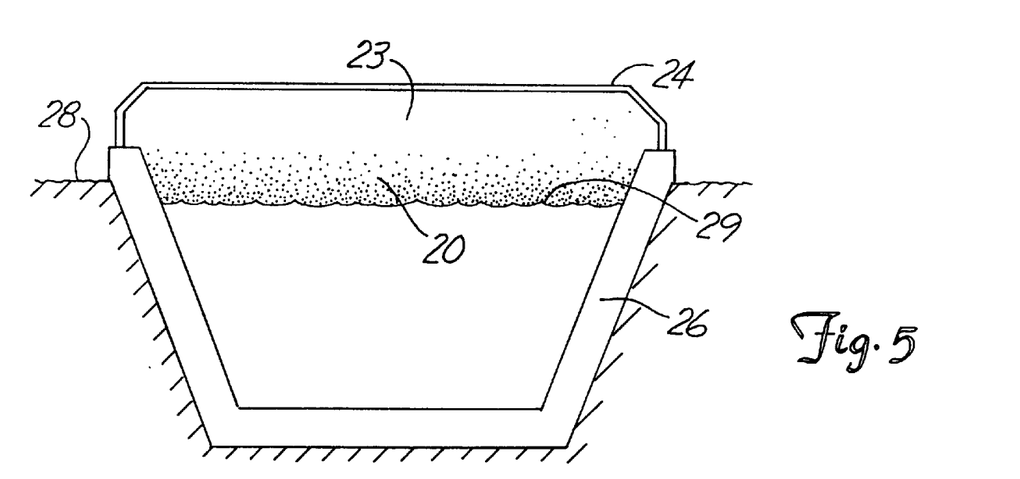
FIG. 5 is a cross-sectional view of a hood over an aqueduct through which carbon dioxide is transported in accordance with the present invention.

FIG. 5 depicts an alternative embodiment in which the aqueducts 26 may be covered by an elongated hood 24. The carbon dioxide 20 is transported in the space 23 between the water 29 and the hood 24 by pumps (not shown) which may be positioned in the hood at the existing pumping stations in the aqueducts.

In another embodiment of the invention, captured carbon dioxide may be stored and transported in large underground aquifers extending from locations where carbon dioxide is produced to agricultural areas where it may be recycled according to the present invention. One such aquifer is the Ogalalla Aquifer extending from North Dakota to Texas in the United States. Large amounts of carbon dioxide may be deposited into such aquifers at industrial locations such as Omaha, Neb. As the carbon dioxide is deposited into the aquifers, it will tend to flow through the aquifer until a layer of carbon dioxide is present throughout substantially all of the aquifer. Carbon dioxide may be recycled onto crops in agricultural regions located above a portion of the aquifer where the flow of the carbon dioxide has reached. This embodiment utilizes the natural transportation infrastructure offered by underground aquifers, while simultaneously preventing the carbon dioxide from entering the atmosphere and preparing it for use in agriculture.

Figure 3:
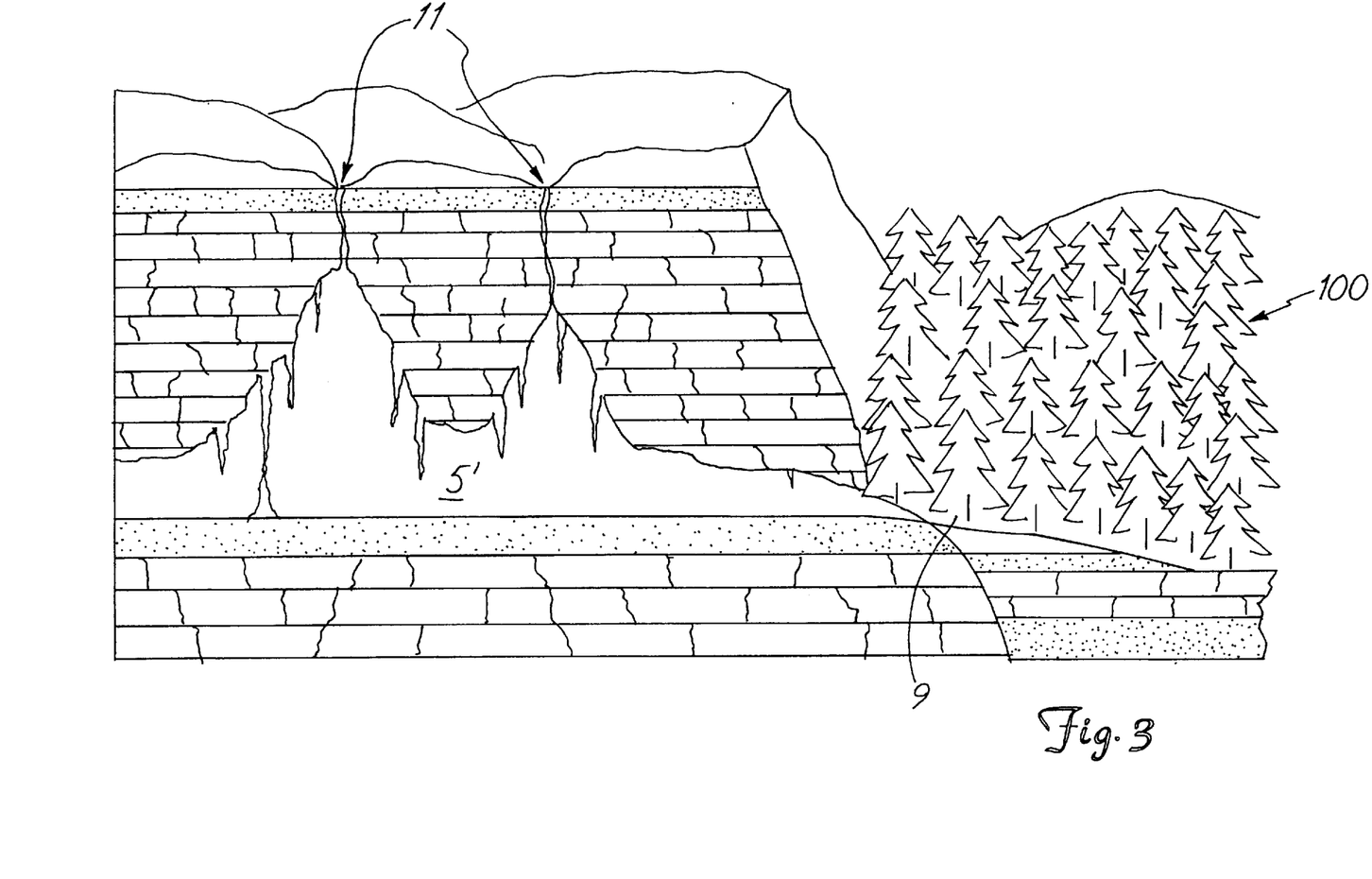
FIG. 3 is schematic illustration of yet another embodiment the method of the present invention.
Figure 4:
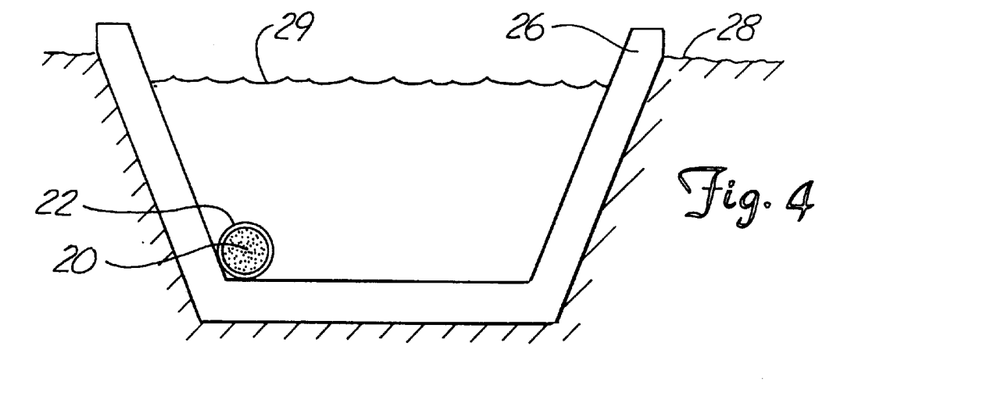
FIG. 4 is a cross-sectional view of a pipe in an aqueduct through which carbon dioxide is transported in accordance with the present invention.

The step of transporting the carbon dioxide from the underground void to a tract of plants includes either siphoning or pumping the carbon dioxide from the underground voids through the infrastructure to the plants. FIG. 3 depicts a preferred embodiment in which naturally occurring siphons 9 may be used to drive the stored carbon dioxide across significant distances through a transportation infrastructure. A source of carbon dioxide may be located near the top of an underground void so that the carbon dioxide may be injected at a point 11 that is elevated above the point where the cooled, high density carbon dioxide is extracted from the void. The difference in elevation and density will cause the carbon dioxide to flow out of the void at the extracting point without mechanical assistance. Such siphoning-like action may then be utilized to drive the carbon dioxide through a transportation infrastructure over significant distances quite inexpensively.

In another embodiment, the densified carbon dioxide may be pumped through the infrastructure to the tracts of plants in a manner similar to the pumping of water. One such system for pumping water already exists between Mono Lake, Calif., and Los Angeles, Calif.

After transporting the cooled, densified carbon dioxide to the tract of plants, the method of the invention involves distributing the densified carbon dioxide to the plants. The distribution step of the present invention preferably uses existing localized irrigation systems for distributing this carbon dioxide to plants under field conditions. If deemed necessary, existing irrigation systems may be modified by providing a separate feed hose for connecting the local irrigation systems to the main carbon dioxide transportation infrastructure used in the transportation step of the invention. In a case where the transportation infrastructure lines are located in aqueducts, the local irrigation systems may be connected to the transportation infrastructure by a separate pipe or hose that extends from the transportation infrastructure to existing irrigation systems. After an irrigation system is connected to the carbon dioxide transportation infrastructure, carbon dioxide may be pumped through the irrigation system on the plants.

Figure 6:
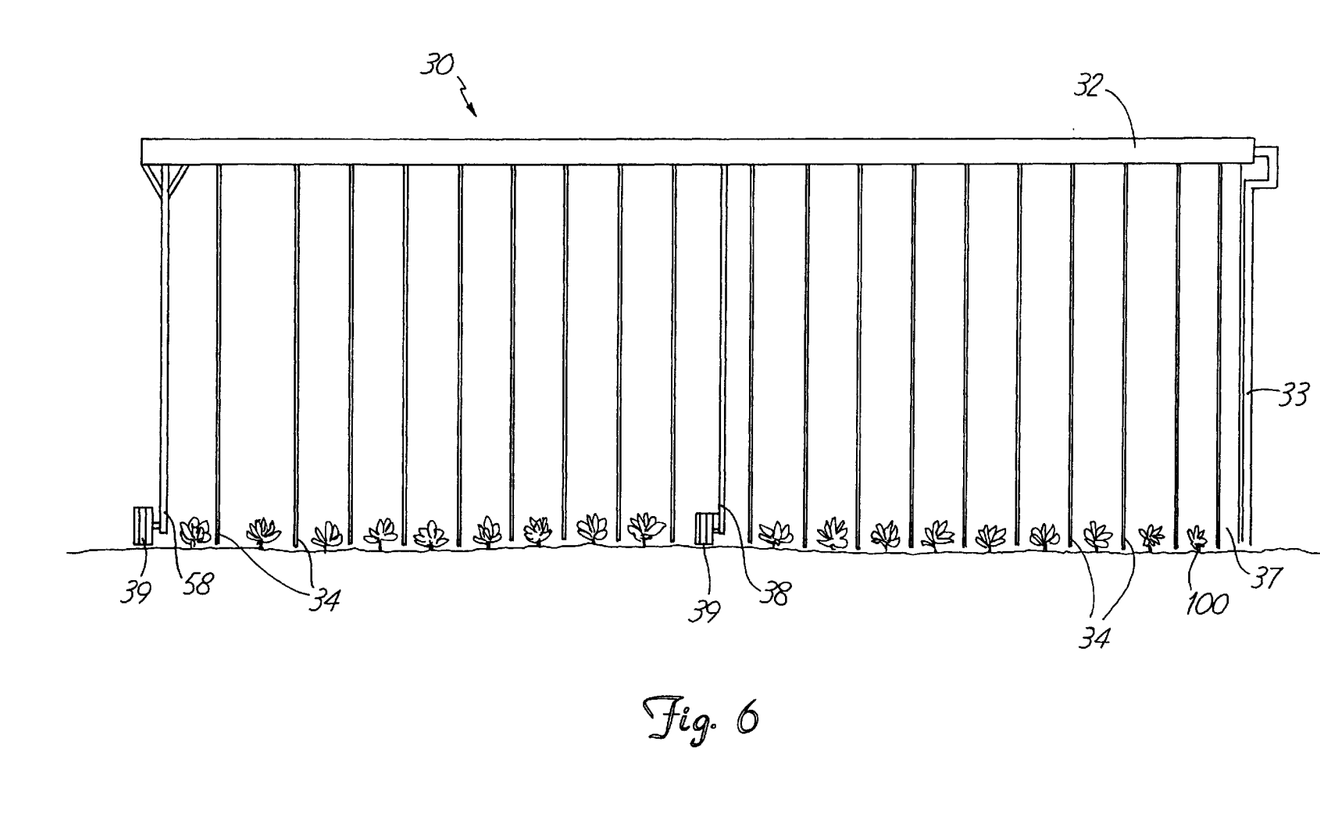
FIG. 6 is a schematic illustration of an existing irrigation apparatus.

One conventional irrigation system particularly well suited for use in the present invention is the pivot irrigation system. Referring to FIG. 6, the pivot irrigation system 30 has a long horizontal pipe 32 supported above the height of the crop by a pivot member 37 and supports 38. A wheel 39 may be attached to the lower end of the support 38 allowing the irrigation system 30 to pivot about the pivot member 37. A plurality of hoses 34 may depend downwardly from the bottom of the horizontal pipe 32. Irrigation in the pivot system is accomplished by pumping water through the horizontal pipe 32 from a feed line 33, and delivering the water to the plants 100 near ground level through the downwardly depending hoses 34.

Figure 7:
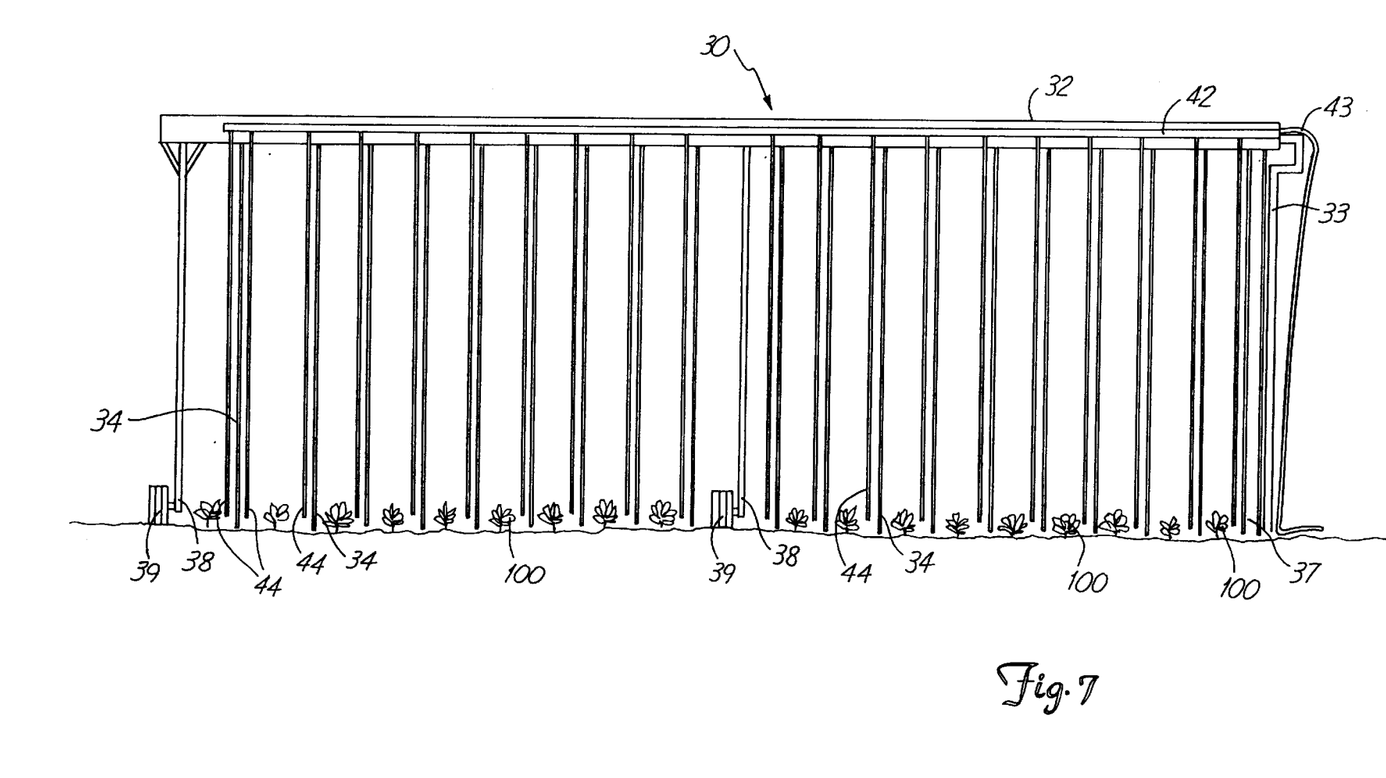
FIG. 7 is a schematic illustration of a dual use carbon dioxide distribution apparatus in accordance with the present invention.

Referring to FIG. 7, a pivot system 30' may be adapted to deliver carbon dioxide to plants by providing a separate feed hose 43 through which carbon dioxide may be pumped. The carbon dioxide may be pumped either into the horizontal pipe 32 and through the downwardly depending hoses 34, or a separate horizontal hose 42 connected to a number of separate downwardly depending lines 44. In this embodiment, the high density carbon dioxide will be delivered in very close proximity to the plants 100 where it will have the highest rate of absorption into the plants. As such, the present invention inexpensively converts existing irrigation systems 30 to dual use irrigation systems 30' that may deliver both water and carbon dioxide to plants at or near ground level.

Figure 8:
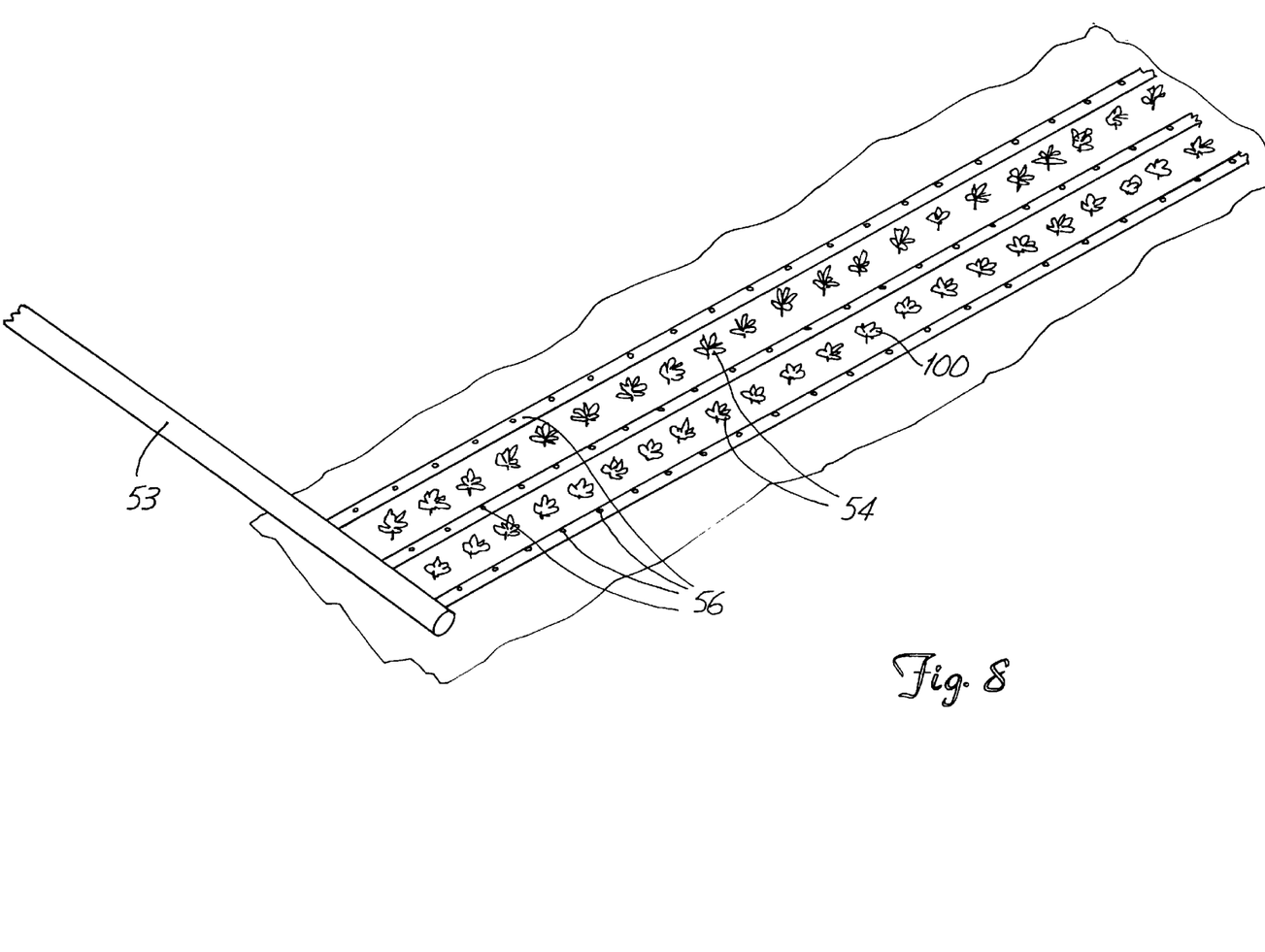
FIG. 8 is a perspective view of a carbon dioxide distribution apparatus in accordance with the present invention.

In an alternative, existing drip irrigation systems may be used to distribute the high density carbon dioxide to plants. Referring to FIG. 8, hoses 54 may be positioned in fields in close proximity to plants 100, and connected to both a water supply and a carbon dioxide transportation infrastructure by a feed line 53. The hoses 54 may also be pipes or any other type of conduit capable of transporting carbon dioxide. The hoses 54 have a number of holes 56 along their length through which the water or the carbon dioxide, or both, is distributed to the plants 100. After the plants 100 are ready for harvesting, the hoses 54 may simply be removed from the fields to accommodate harvesting equipment or personnel.

Figure 9:
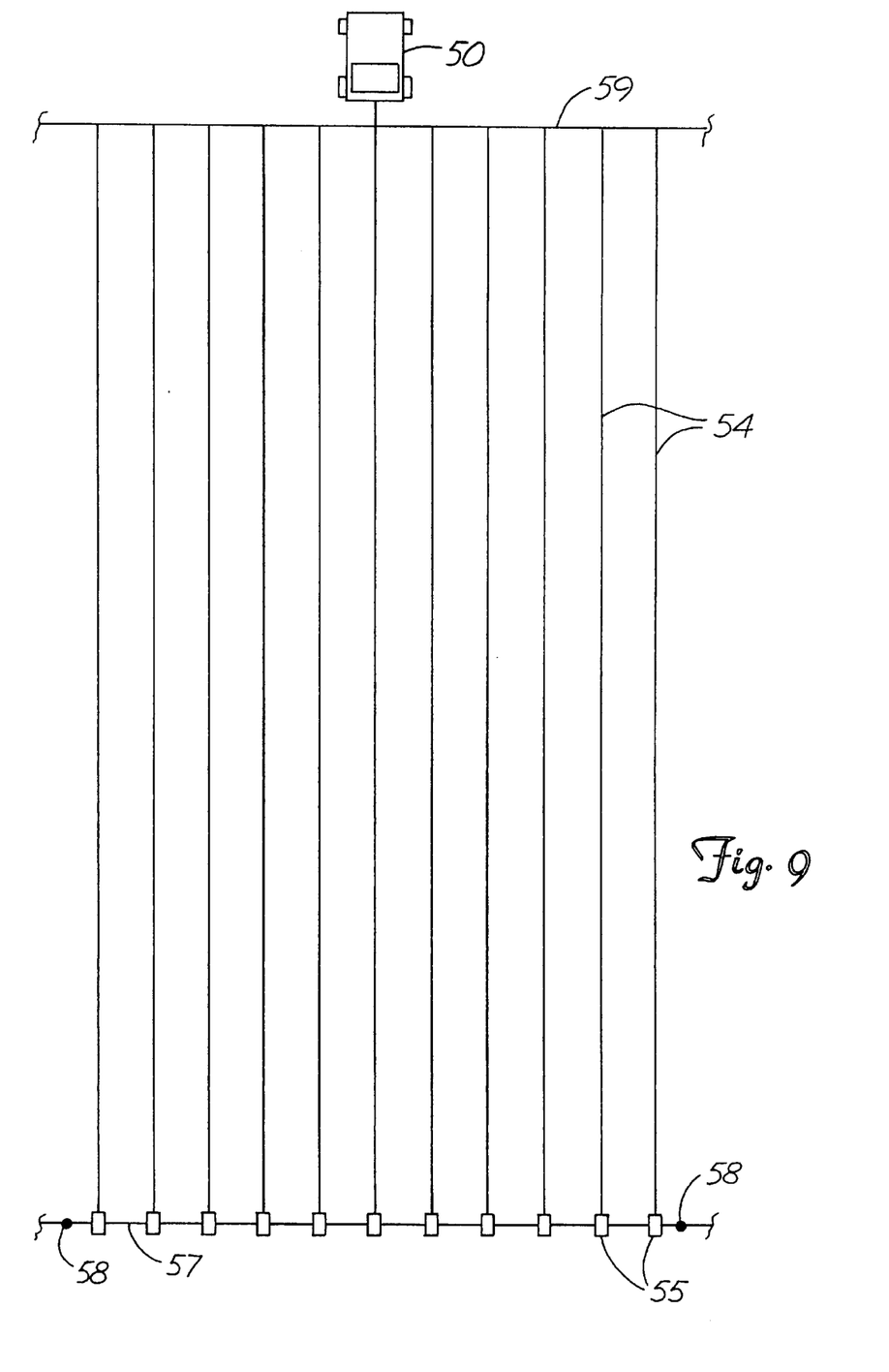
FIG. 9 is a schematic view of another carbon dioxide distribution apparatus in accordance with the present invention.
Figure 10:
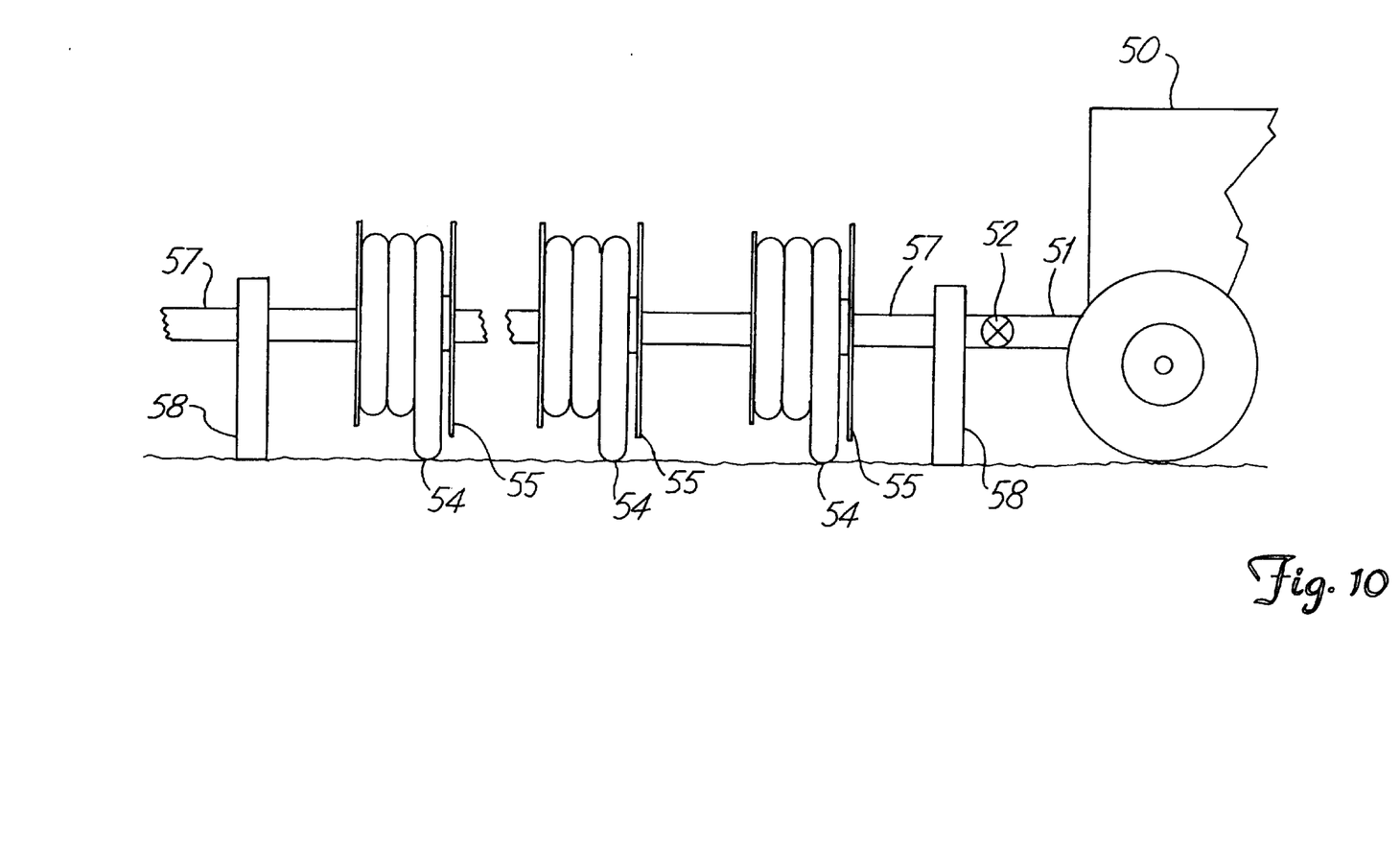
FIG. 10 is another schematic view of the carbon dioxide distribution apparatus of FIG. 9.

FIGS. 9 and 10 depict another device for distributing the high density carbon dioxide to plants in accordance with the present invention. After a tract has been tilled and planted, a number of hoses 54 for distributing carbon dioxide to the plants may be deployed in the field using a hose roll-out and retrieving system. The roll-out system may include a number of wheels 55 attached to a common shaft 57. The shaft 57 may be rotatably supported by a number of stanchions 58 spaced along the length of the shaft 57. Each hose 54, similar to that shown in FIG. 8, may have one end attached to a wheel 55 and the other end attached to a common pull bar 59. The pull bar 59 may be operatively attached to a tractor 50 so that the hoses 54 will be positioned in the field by merely driving the tractor 50 and pull bar 59 away from the common shaft 57. The carbon dioxide may be distributed to plants through the hoses 54 by connecting the hoses to a carbon dioxide feed line (not shown) running through the shaft 57, and pumping the carbon dioxide through the hoses 54.

Referring specifically to FIG. 10, the hoses 54 may be retrieved from the field by attaching the power-take-off 51 of the tractor 50 to the common shaft 57 at a joint 52. Prior to harvesting, the hoses 54 may be wound onto the wheels 55 as the power-take-off 51 rotates the shaft 57 in a manner that retracts the hoses 54 from the field.

The distributing step of the present invention involves distributing carbon dioxide to plants in an individual tract of land under field conditions, optimally during the daylight hours when photosynthesis occurs. Ideally, the carbon dioxide is delivered to the plants when the temperature is between 70° F. and 80° F., the optimal temperature range for photosynthesis. It will be appreciated that carbon dioxide may be delivered at other temperatures, and in fact, the cooling effect of the cooled carbon dioxide may keep the temperature next to the plants between 70–80° F. even though the ambient temperature is higher, such as 90° F. or more. As such, the distribution step of the present system not only provides more carbon dioxide when the plants are at peak photosynthesis temperatures, but it also prolongs the time period when those temperatures occur.

The distribution step of the invention maximizes the use of existing irrigation systems because water is generally delivered to the plants using such systems during the evening and night hours in order to minimize evaporation and maximize absorption, while photosynthesis can only occur during the daylight hours. Additionally, photosynthesis is optimal when the temperature is between 70° and 80°, a temperature range which is highly inefficient for irrigation with water due to evaporation losses. Thus, the present invention converts conventional single use water irrigation systems into highly efficient dual use water and carbon dioxide irrigation systems without any impact on water irrigation.

The interrelationships of the steps of the method of the present invention provides a comprehensive method for reducing the amount of carbon dioxide that enters the atmosphere while enhancing plant growth in an effective and economical manner. The present invention may also minimize capital expenditures by using existing underground voids and existing irrigation systems to implement the process. Most importantly, the method of the present invention is capable of using a large amount of carbon dioxide, which would otherwise enter the atmosphere, for the beneficial purpose of enhancing plant growth.

The above discussion is directed primarily toward growing plants on tracts of land. In an alternative embodiment of the invention schematically shown in FIG. 11, the method includes the steps of capturing the carbon dioxide, delivering the carbon dioxide to a sewage treatment facility, impregnating sewage effluent with the captured carbon dioxide, and depositing the carbon dioxide-rich effluent into a large body of water such as a sea, ocean or even a large fresh water lake. The body of water should be sufficiently large so that the ratio of the volume of effluent to the existing volume of water is less than one percent. The capturing step of this embodiment may be performed by any of the techniques described above such as at a carbon dioxide source 62. The delivery step of this embodiment may be performed by direct delivery of the captured carbon dioxide to the sewage treatment facility 66 using pipes 64 or the like. Where direct delivery is not available, the captured carbon dioxide may be encapsulated and hauled as described above in reference to other embodiments of the invention. The impregnating step may be performed in any number of ways, such as by bubbling carbon dioxide gas through sewage effluent. Preferably, the carbon dioxide is introduced to the sewage effluent shortly before the effluent is deposited into the ocean 60 so that it may not escape into the atmosphere.

Figure 11:
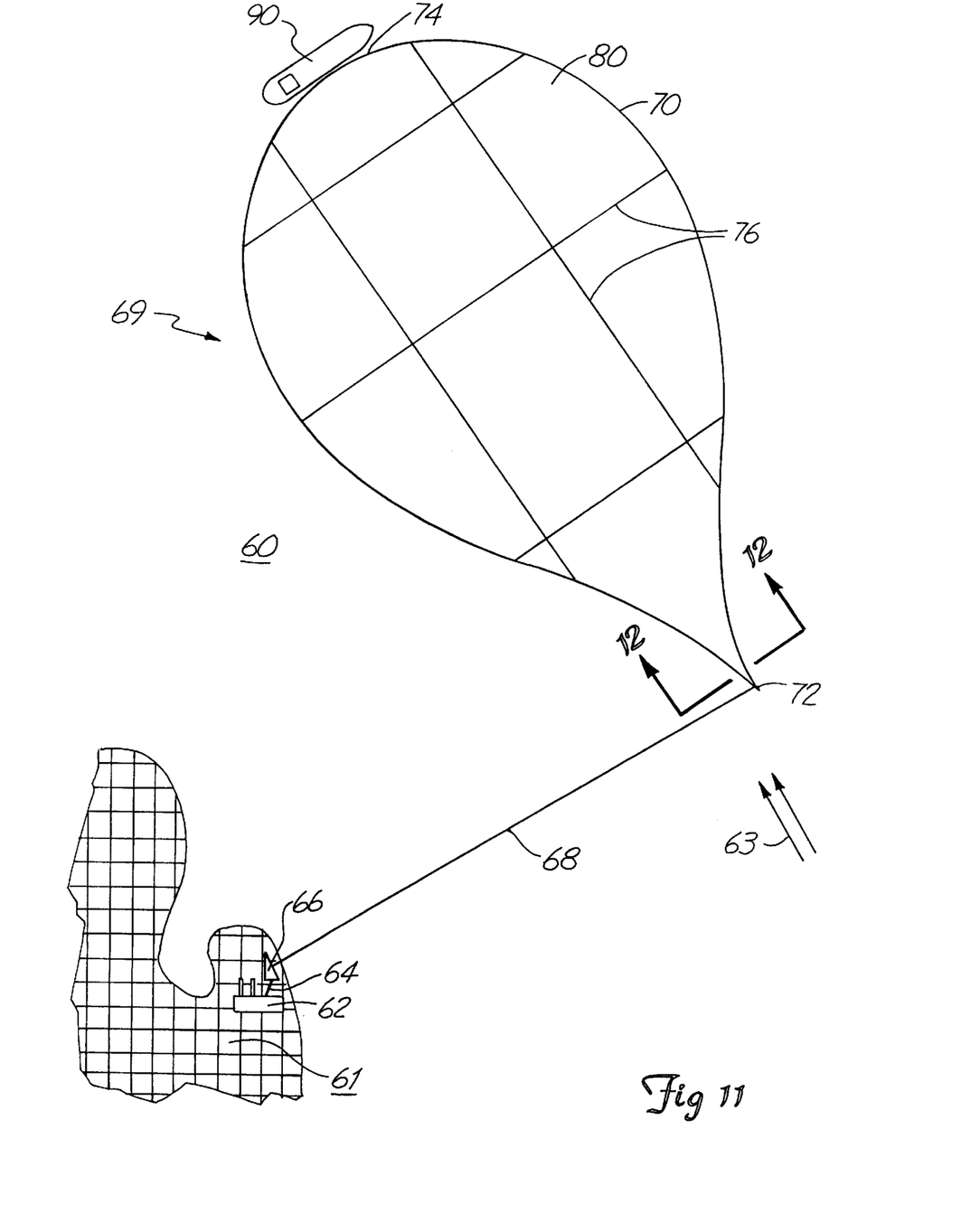
FIG. 11 is a schematic view of an aquatic farm in accordance with the present invention.

The depositing step may be performed by introducing the carbon dioxide-enriched effluent into the existing systems that use outfall pipes 68 to deposit sewage effluent into the ocean. One such system is currently being built in Boston, Mass., and other systems already exist in Los Angeles, Calif. and San Diego, Calif. Preferably, this embodiment is used in cities 61 located near a body of water which have an existing infrastructure to deposit sewage effluent into the water several miles from the shore. The depositing step may alternatively be performed by loading the carbon dioxide-impregnated effluent into a tanker ship, and shipping it to a deposit site in a large body of water.

Figure 12:
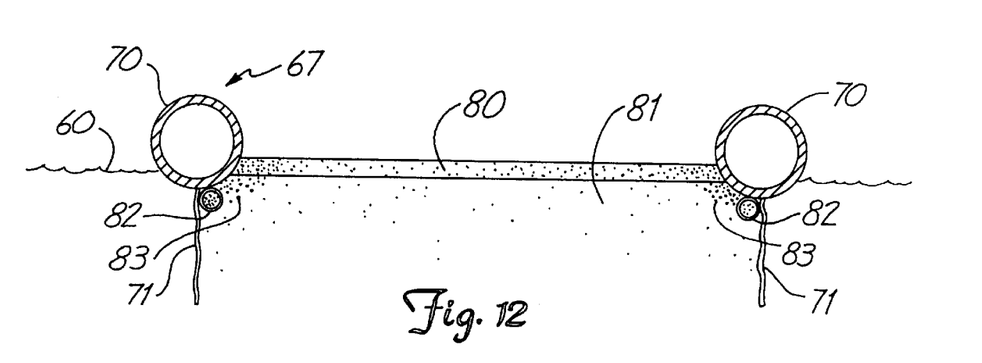
FIG. 12 is cross-sectional, schematic view of the aquatic farm of FIG. 11.

Referring to FIGS. 11 and 12, a preferred embodiment places carbon dioxide-impregnated effluent 80 in an aquatic farm 69 for growing carbon dioxide-absorbing algae and the like. A containment apparatus having a perimeter 70 that may be made from a floating boom such as the type used to contain oil spills can be used to define the area of the aquatic farm. The containment apparatus may further have a weighted fabric curtain 71 depending downwardly into the water to depth of at least one foot, and a grid of cross booms 76 floating on the surface to enhance the restraining characteristics of the containment apparatus. The containment apparatus may be very large, occupying several square miles of surface area, and should be positioned so that a leading end 72 is placed up-current and a trailing end is placed down-current of a current 63. The step includes placing carbon dioxide-impregnated effluent 80 into the leading end 72 of the containment apparatus and letting algae or the like grow as it floats with the current towards the trailing end 74. A harvesting vessel 90 may be positioned at the trailing end 74 of the containment apparatus to process the resulting algae into a useful substance, or the algae may be allowed to float freely, providing an abundant food source for aquatic life.

In a preferred embodiment of the sewage effluent invention, excess heat exhausted from the power plant 62 is used to heat the carbon dioxide-impregnated sewage effluent 80. Alternatively, the effluent may be heated using heat from a geothermal source. The heated effluent 80 is then deposited and placed on the surface of the water in an aquatic farm 69 as previously described. By depositing heated effluent 80 in the farm 69, the effluent 80 will tend to remain on the surface of the water for a period of time, thereby enhancing the ability of the floating barriers 70 to contain the effluent 80.

Such aquatic farms 69 may be located at the terminal end of an outfall pipe 68, or other strategic locations, such as geothermal sites, shipping lanes, or oil/gas platforms. In one embodiment, the aquatic farm 69 may be located at an oil platform such as the Kerr-McGee Corporation's platform in the North Sea. Generally, oil/gas platforms are a source of carbon dioxide and heat as they burn off excess gases that are produced while extracting oil. In this embodiment, the floating boom 70 and grids 76 may be attached to the platform (not shown) or anchored nearby. For example, in the Kerr-McGee platform, the platforms may be attached to a stationary ship. The effluent 80 may be transported to the aquatic farm 69 in tanker ships, and deposited into the aquatic farm as the ships are loaded with oil from the platform. One side benefit of attaching the floating boom 70 to an oil/gas platform is that the booms are also available for oil spills. The effluent 80 may be delivered to such sites, using large, collapsible bladders (not shown) similar to those described in U.S. Pat. No. 5,300,226 on tanker ships. Preferably, the bladders can be filled with effluent as the cargo of the ship is emptied while the ship is in port. The effluent may then be transported in the tanker ship to an aquatic farm and discharged from the ship into the aquatic farm. By simultaneously loading the effluent and discharging oil/gas, and locating the aquatic farm near a shipping lane, the additional time necessary to haul the effluent is minimized. Preferably, the effluent is hauled in regular tankers and carbon dioxide may be hauled in the gaseous or liquid state in Liquid Natural Gas ships.

In another embodiment of the invention, the floating barrier 70 can be used to distribute excess carbon dioxide to the floating effluent 80 in the farm 69. In one embodiment, a positive pressure of carbon dioxide gas is maintained in the floating barrier 70, and the gas is allowed to flow out of the barrier through small orifices (not shown) along the inner perimeter of the barrier. In a preferred embodiment, a separate conduit 82 through which carbon dioxide 83 may flow may be carried by the floating barrier 70 and the grids 76. The separate conduit may have a number of holes along its length so that carbon dioxide 83 may be distributed to the effluent 80. The floating barrier 70 and the grids 76, therefore, may serve to both contain the effluent 80 and support the delivery and distribution of carbon dioxide to the effluent.

In a preferred embodiment of the invention, the floating barriers 70 may be submerged in case the water becomes too rough and threatens to damage the barrier. In this embodiment, the barrier may be deflated or weighted by using weights (not shown) having an appropriate specific gravity which may be attached to the barrier so that the barrier will be submerged to a predetermined depth. Similarly, the barriers 70 may be submerged using a balast such as water or any other suitable balast. Although the sewage effluent 80 will float freely after the barrier is submerged, the barrier will not be damaged and it can be re-inflated and used again.

The embodiment in which the sewage effluent is impregnated with carbon dioxide is an extremely advantageous method of recycling carbon dioxide because this embodiment will not require the construction of any significant infrastructure in order to implement the method. Moreover, the carbon dioxide-enriched sewage effluent will encourage the growth of basic sea life, helping to replenish the overburdened ecosystems in our oceans.

While a preferred embodiment of the present invention has been described, it should be understood that various changes, adaptations and modifications may be made therein without departing from the spirit of the invention and the scope of the appended claims.

What is claimed is:

1. A method of recycling carbon dioxide for enhancing plant growth, comprising the steps of:
   a) collecting carbon dioxide-containing gas;
   b) storing the carbon dioxide-containing gas in an underground void which is substantially free of methane and which has a temperature therein of no more than about 68° F.; and
   c) subsequently, distributing the stored carbon dioxide-containing gas to plants within a contiguous tract of plants under field conditions during daylight hours and distributing water to the plants during non-daylight hours.

2. The method of claim 1, wherein a dual use irrigation apparatus capable of separately distributing water and carbon dioxide gas is provided, the distribution of said gas during daylight hours comprising pumping carbon dioxide through the irrigation apparatus and the distribution of said water during non-daylight hours comprising pumping water through the same irrigation apparatus.

3. The method of claim 2, wherein the carbon dioxide is pumped through the dual use irrigation apparatus when the ambient temperature is between about 70° F. and about 90° F.

4. The method of claim 1, wherein said gas is distributed using an irrigation apparatus having a shaft rotatably supported by a plurality of stanchions, a wheel attached to the shaft, and a hose having first and second ends, the first end of the hose being attached to the wheel and the second end of the hose being attached to a pull bar on the back of a tractor, the method further comprising deploying the hose in a field by moving the tractor generally away from the shaft, pumping said gas through the hose during daylight hours, and retracting the hose by rotating the shaft to roll the hose on the wheel.

5. A method of enhancing the growth of plants in a field having an ambient temperature comprising the steps of:

a) providing a dual use irrigation apparatus capable of separately distributing water and carbon dioxide-containing gas to a tract of plants;

b) connecting the dual use irrigation apparatus to a supply of carbon dioxide-containing gas cooled to a temperature of no more than about 68° F.;

c) connecting the dual use irrigation apparatus to a supply of water; and d) distributing carbon dioxide through the irrigation apparatus during daylight hours and distributing water through the same irrigation apparatus during non-daylight hours.

6. The method of claim 5 wherein the carbon dioxide is delivered to the dual use irrigation apparatus when an ambient temperature of the field is between about 70° F. and about 90° F.

7. The method of claim 5 wherein the carbon dioxide supply is connected to the dual use irrigation apparatus by connecting a feed line to the dual use irrigation apparatus and the water supply is connected to the dual use irrigation apparatus by connecting a feed line to the apparatus.

8. The method of claim 5 wherein the dual use irrigation apparatus has a first delivery system for delivering the carbon dioxide to the plants and a separate, second delivery system for delivering water to the plants; the step of connecting the apparatus to the carbon dioxide supply comprising connecting the carbon dioxide supply to the first delivery system, the step of connecting the apparatus to the water supply comprising connecting the water supply to the second delivery system.

9. The method of claim 5 wherein said dual use irrigation apparatus comprises a pivot irrigation system having a horizontal pipe connected to a pivot, further comprising the step of pivoting the horizontal pipe about said pivot when distributing water to the plants.

10. The method of claim 9 further comprising the step of pivoting the horizontal pipe about said pivot while delivering carbon dioxide to the plants.

11. The method of claim 5 wherein the irrigation apparatus includes a shaft rotatably supported by a plurality of stanchions, a wheel attached to the shaft, and a hose having first and second ends, the first end of the hose being attached to the wheel and the second end of the hose being attached to a pull bar on the back of a tractor; the distribution step further comprising: deploying the hose in a field by moving the tractor generally away from the shaft, pumping carbon dioxide through the hose during daylight hours, and retracting the hose by rotating the shaft to roll the hose on the wheel.

12. The method of claim 5 wherein the dual use irrigation apparatus has a first delivery system comprising a first horizontal conduit and a plurality of downwardly depending hoses in fluid communication with the first horizontal conduit and a second delivery system comprising a second horizontal conduit and a plurality of downwardly depending hoses in fluid communication with the second horizontal conduit; the step of connecting the apparatus to the carbon dioxide supply comprising connecting the carbon dioxide supply to the first horizontal conduit, the step of connecting the apparatus to the water supply comprising connecting the water supply to the second horizontal conduit.

13. The method of claim 12 wherein said step of distributing carbon dioxide comprises delivering the carbon dioxide through the downwardly depending hoses operatively linked to the first horizontal conduit, thereby directing the carbon dioxide to flow downwardly toward the ground adjacent said plants.

14. A method of enhancing the growth of plants in a field having an ambient temperature comprising the steps of:

a) providing a dual use irrigation apparatus having a first and second delivery systems, the first delivery system comprising a horizontal carbon dioxide conduit and a plurality of downwardly depending carbon dioxide hoses in fluid communication with the horizontal carbon dioxide conduit, the second delivery system comprising a horizontal water conduit and a plurality of downwardly depending water hoses in fluid communication with the horizontal water conduit;

b) connecting the horizontal carbon dioxide conduit to a supply of carbon dioxide-containing gas cooled to a temperature of no more than about 68° F.;

c) connecting the horizontal water conduit to a supply of water; and d) during daylight hours, distributing carbon dioxide through the horizontal carbon dioxide conduit and thence downwardly through the carbon dioxide hoses toward the ground adjacent said plants; and e) during non-daylight hours, distributing water through the horizontal water conduit and thence downwardly through the water hoses toward the ground adjacent said plants.

* * * * *